April 23, 1963 A. J. DE STASI 3,086,661
CARGO CONTAINER CARRIER AND LIFTING SPREADER THEREFOR
Filed Oct. 26, 1961 4 Sheets-Sheet 1
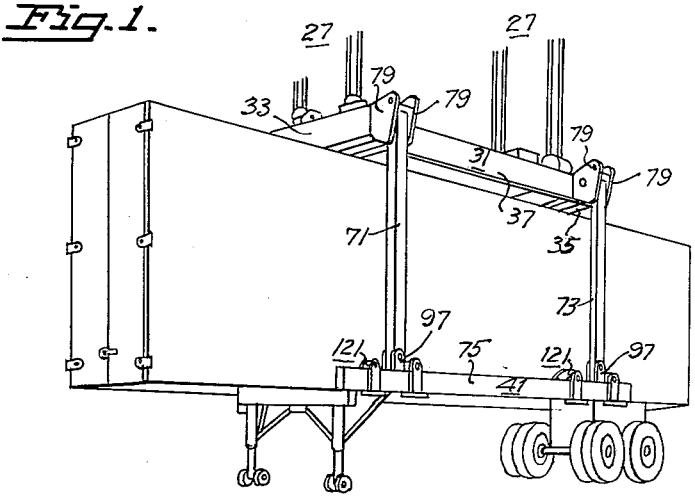
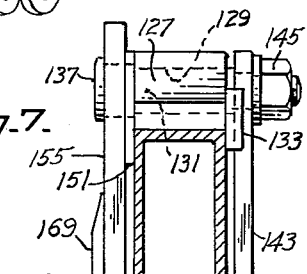
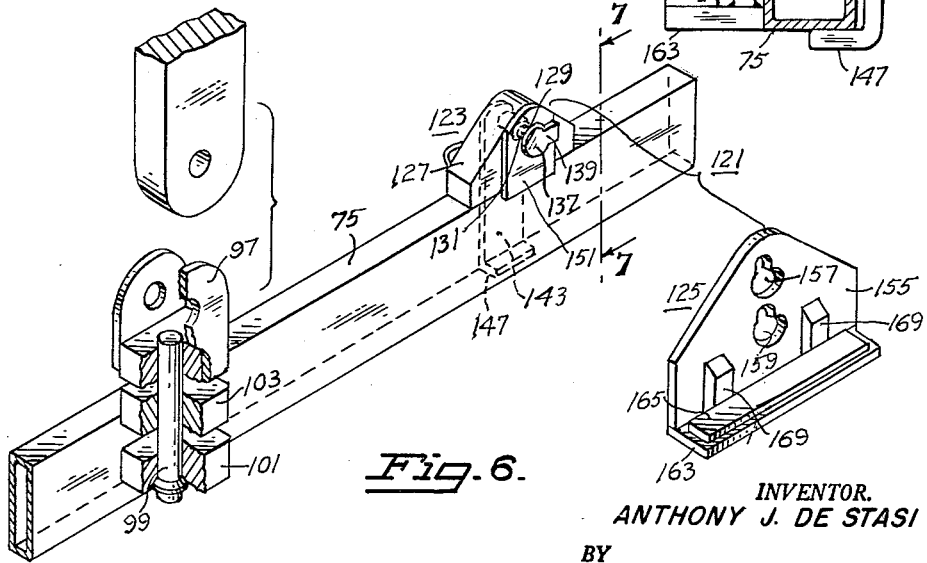
INVENTOR.
ANTHONY J. DE STASI
BY
Bruce & Brosler
HIS ATTORNEYS

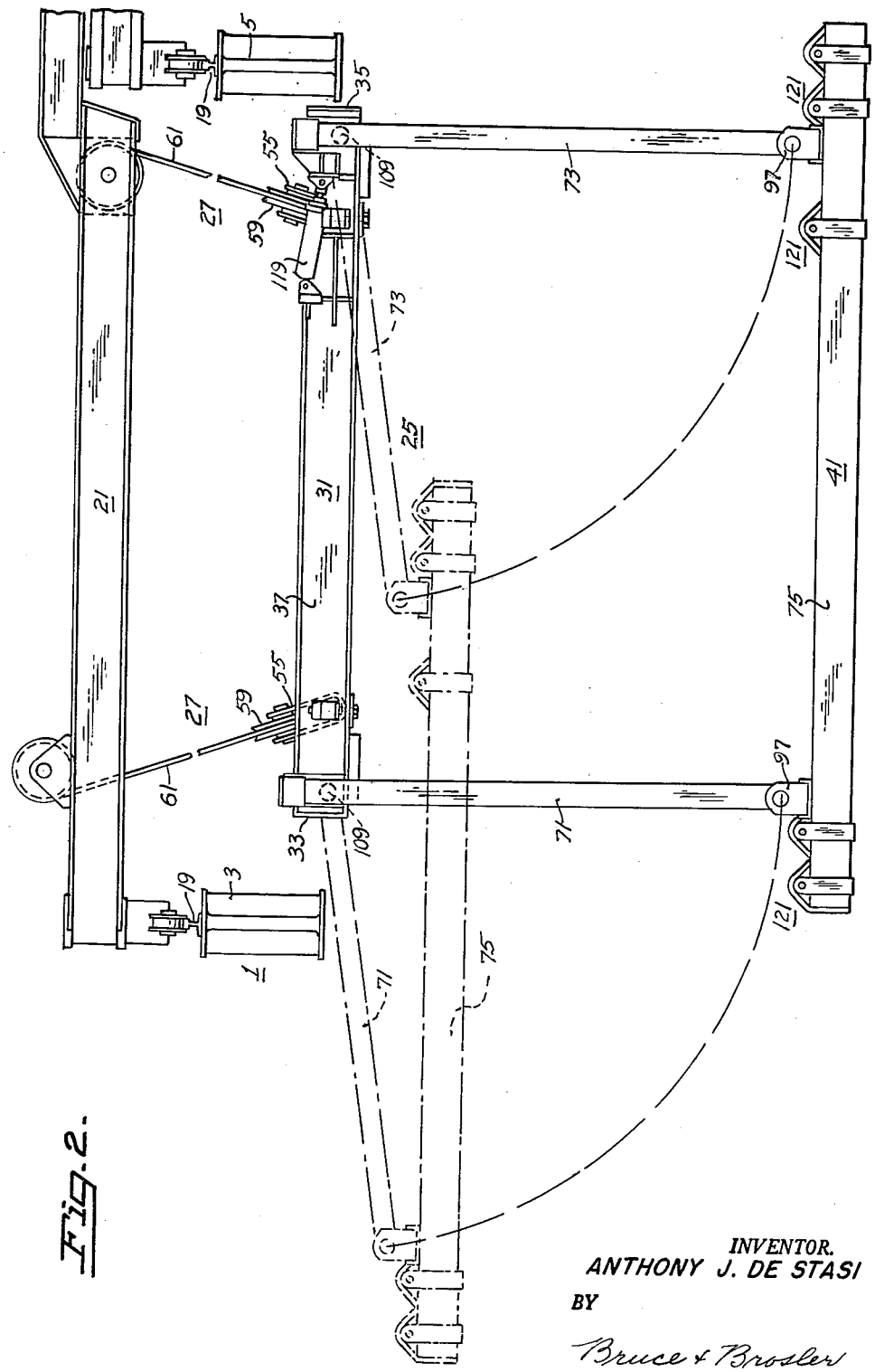

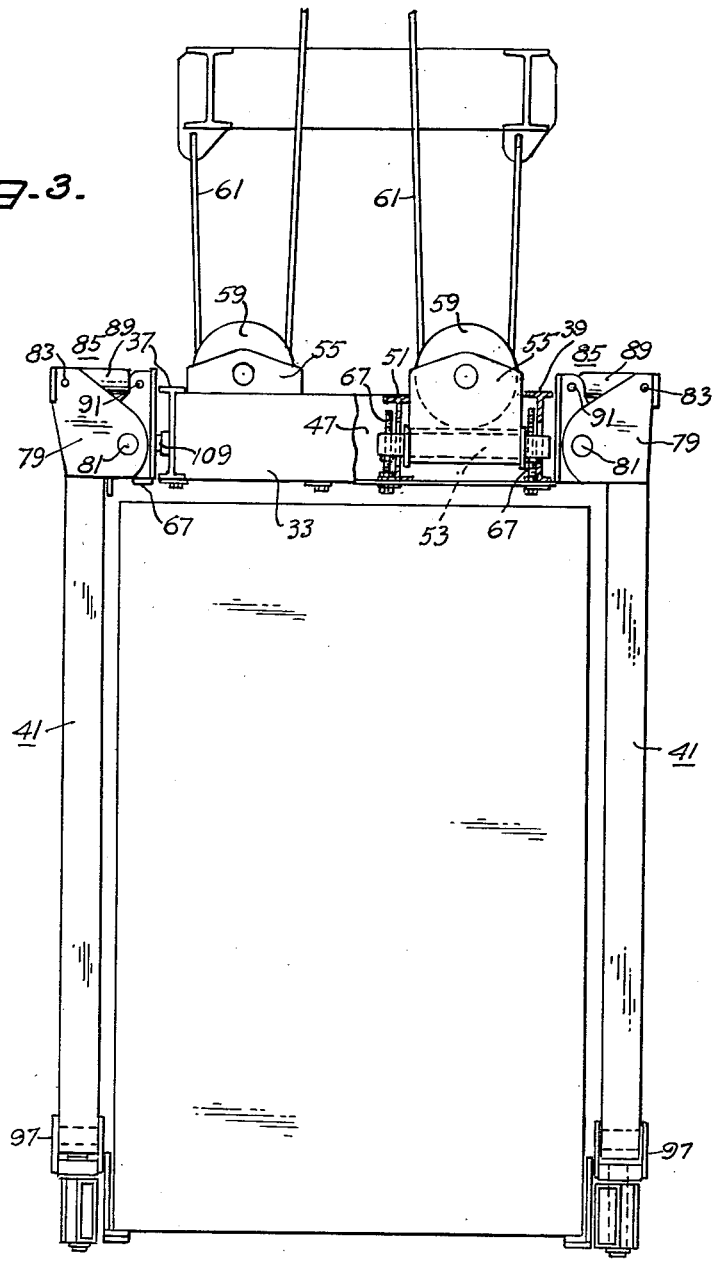

April 23, 1963  A. J. DE STASI  3,086,661
CARGO CONTAINER CARRIER AND LIFTING SPREADER THEREFOR
Filed Oct. 26, 1961  4 Sheets-Sheet 4
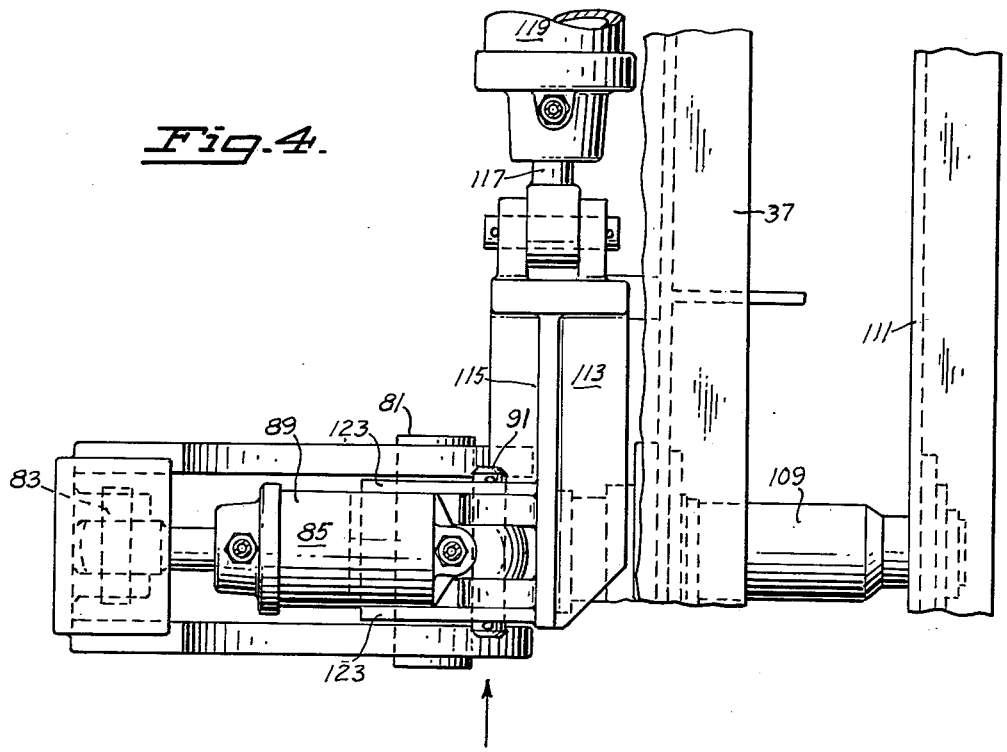
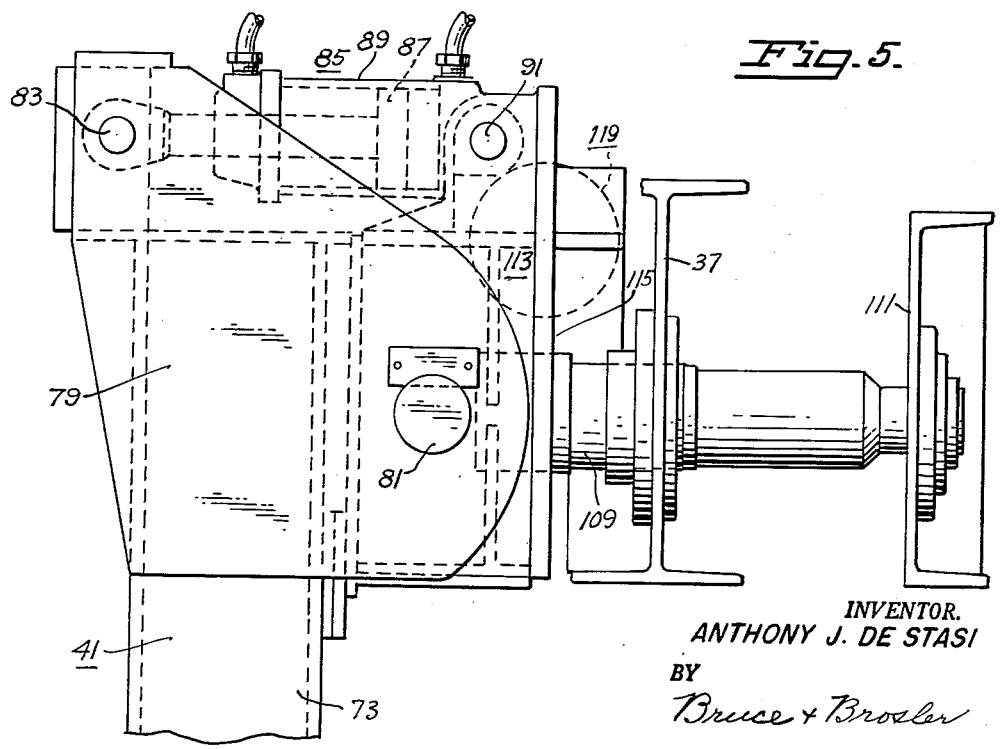
INVENTOR.
ANTHONY J. DE STASI
BY
Bruce & Brosler
HIS ATTORNEYS

United States Patent Office 3,086,661
Patented Apr. 23, 1963

3,086,661
CARGO CONTAINER CARRIER AND LIFTING
SPREADER THEREFOR
Anthony J. De Stasi, Oakland, Calif., assignor to Pacific
Coast Engineering Company, a corporation of California
Filed Oct. 26, 1961, Ser. No. 147,923
10 Claims. (Cl. 212—11)

My invention relates to the handling of cargo, and more particularly to a cargo container carrier and lifting spreader assembly for such carrier, for the lifting and moving of cargo containers, trailers, and the like.

Lifting spreaders of the type involved in the present invention are useful in connection with cargo handling carriers which may be of the gantry crane type, the lifting spreaders being suspended by a sheave system from a trolley assembly under the control of an operator, from an operator's station on the carrier.

The lifting spreader is adapted to be lowered over and clamped about a cargo container, trailer or the like, then elevated with its load, which is then moved within the range of movement of the trolley assembly, if that be sufficient, or carried by the carrier from one location to another.

Lifting spreaders, necessarily have vertical dimension of some magnitude, and when designed for the handling of standard cargo containers which are usually eight feet high, or trailers and the like, such dimension will necessarily be in excess of eight feet to straddle and grasp such cargo handling means. Accordingly, unless the crane which carries the lifting spreader, is unreasonably high, which would render it both costly and unstable, difficulty is often experienced in maneuvering a carrier into position, particularly with regard to the loading and unloading of trailers or cargo containers to or from rail cars.

Among the objects of the present invention are:

(1) To provide a novel and improved carrier for cargo containers, trailers and the like;

(2) To provide a novel and improved carrier of the gantry crane type for cargo containers, trailers and the like, which may be readily positioned for the loading and unloading of such cargo;

(3) To provide a novel and improved lifting spreader for a cargo carrier;

(4) To provide a novel and improved lifting spreader, adjustable to provide elevation clearance for facilitating the maneuverability of a cargo container utilizing a lifting spreader.

Additional objects of my invention will be brought out in the following description of a preferred embodiment of the same, taken in conjunction with the accompanying drawings, wherein:

FIG. 1 is a three-dimensional view of a lifting spreader embodying the present invention and depicting the same with a load;

FIG. 2 is a side view in elevation of the lifting spreader of FIG. 1 depicted in relationship to a gantry type crane;

FIG. 3 is an end view in elevation of the lifting spreader of FIG. 1;

FIG. 4 is a plan view of one corner of the lifting spreader of FIG. 2;

FIG. 5 is a view in elevation looking in the direction of the arrow of FIG. 4;

FIG. 6 is an exploded view, partly in section, of features of the lifting spreader of FIG. 1;

FIG. 7 is an enlarged view of a detail of the structure of FIG. 6.

Referring to the drawings for details of my invention in its preferred form, the specific cargo carrier depicted therein is in the form of a gantry type crane 1 which may be of any conventional form and construction. Such crane may involve spaced parallel girders 3, 5, the girders being supported upon the upper ends of a pair of parallel-spaced U-shaped frames (not shown).

Each of the girders 3, 5 is provided with a rail 19, the two rails together comprising a track for supporting a trolley assembly 21 adapted to move from one end of the girders to the other, the trolley assembly adjustably supporting a lifting spreader assembly 25, by means of a sheave system 27, enabling the lifting spreader assembly to be elevated and lowered under control of an operator working from a station strategically located on the carrier frame.

The trolley assembly and associated sheave system may be of any known type, that which is illustrated, forming the subject matter of a co-pending application of Murray M. Montgomery for Cargo Container Handling Equipment, Serial No. 97,834, filed March 23, 1961, now Patent No. 3,061,110.

The lifting spreader assembly to which the present invention relates, involves a substantially horizontal main frame 31 including parallel end beams 33, 35 connected by side beams 37, 39, and from this main frame, depend a pair of similar spreader arms 41.

Extending between the side beams 37, 39 of the main frame, in spaced relationship to each of the end beams, is a cross beam 47, each connected at spaced intermediate points to the proximate end beam, by short I beam sections 51. Each of these I beam sections and its proximate side beam provide for the installation and support of a lifting rod or bar 53 to each of which is applied a swingable sheave bail 55 for rotatably supporting a sheave 59 which is included in the sheave system for elevating and lowering the lifting spreader.

These lifting bars are preferably adjustably mounted for adjusting the hoist ropes 61. For this purpose, each lifting bar is extended at each end through a slot cut in the supporting beam, and threadedly supported on a vertical adjusting screw 67 which is rotatably mounted in a flange of the associated beam. Such bail mounting of the sheaves permits of automatic change in the angular relationship thereof to the plane of the main frame, occasioned by change in elevation of the lifting spreader assembly when in use.

Each of the spreader arms includes a pair of vertically disposed structural members 71, 73 and a base beam 75 connecting said structural members adjacent their lower ends. In accordance with the present invention, each spreader arm is so constructed and so attached to the main frame 31 as to permit both lateral, as well as longitudinal swing adjustment of such arms.

To accomplish such permissible adjustments, each of the vertically disposed structural members 71, 73 at its lower end is pivotally connected to the base beam 75. At the upper end of each, a pair of side plates 79 of generally triangular configuration are welded or affixed to opposite sides of the structural member, such triangular plates extending both laterally and upwardly beyond the boundaries of the structural member with the extended portions drilled for the reception of spaced pins 81, 83 to create a lever of the bell crank type, the pin 81 constituting a hinge pin, on which the structural member 71 or 73 might swing, while the other permits of connection thereto of a hydraulically operated piston connection 85 for controlling the extent of such swing.

Such hydraulically operated piston connection, may take the form of a double acting piston 87 in a cylinder 89 hingedly secured to a pin 91, while the piston 87 is similarly coupled through its rod to the pin 83. Thus depending upon which end of the cylinders 89 the hydraulic fluid enters, each spreader arm may be swung outwardly to permit straddling of cargo by the lifting spreader, or returned to normal vertical position to cause such cargo to be grasped by the arms to enable such cargo to be lifted.

To permit of the lifting spreader to effectively reduce or shorten its vertical dimension so as to facilitate maneuverability of the device, particularly in the matter of positioning the device above cargo over which the device is to be lowered, to secure the same about such cargo, each hinge pin 91 is mounted for arcuate movement about a fixed point on the proximate side beam 37, 39 of the main frame, and in conjunction therewith, the hinge connection of each vertical structural member 71, 73 to the base beam 75 enables angular movement of the spreading arms in a longitudinal direction.

Such hinge connection may be realized by connecting the lower end of each vertical member in a clevis 97 which in turn is swivel mounted to the base beam 75 by a vertical clevis pin 99 journalled in vertically spaced bearings 101, 103 carried by the base beam.

The point about which the cylinder anchor pin 91 is to move in traversing such arcuate path, is preferably selected to be in the horizontal plane through the pin 81, and at this point, a stub shaft 109 is preferably rotatably mounted in the proximate side frame member 37 or 39 and a parallel beam section 111 spaced therefrom in the frame 31, one end of the stub shaft extending beyond the side frame member to receive and support a bracket assembly 113, involving a bell crank type lever 115 having vertical and horizontal arms and is welded at the lower end of its vertical arm to the exposed end of said stub shaft 109, with the free end of its horizontal arm coupled to the rod 117 of a drive cylinder assembly 119, which is affixed to the proximate side frame member 37 or 39 as the case may be. To the vertical arm of such lever 115 are welded parallel plates 123 provided with aligned holes to receive the hinge pin 81 and the anchor pin 91 for the cylinder 89.

With the lifting spreader structure thus far described, it will be apparent that the spreader arms may be swung laterally for application to and removal from a load such as a cargo container or trailer. The added ability to swing the spreader arms in a longitudinal direction so as to elevate the same for clearance purposes, will greatly enhance the maneuverability of the cargo handling means, of which the lifting spreader forms a component part.

However, to enable the lifting spreader to effectively handle the load, necessitates the addition thereto of structure which will permit the lifting spreader to grasp and support such a load. For this purpose, there is provided a plurality of shoe essemblies 121 adapted for slidable adjustment along the base beam of the spreader arms, with each shoe assembly adapted to extend beneath the lower edge of the load for lifting purposes.

Each such shoe assembly comprises a swivel assembly 123 adapted for slidable mounting on such beam at any convenient location thereon, and a shoe 125 adapted for suspension from said swivel assembly and extend beneath the load to carry its share thereof.

The swivel assembly includes a swivel base or block 127 adapted to slidably rest on the upper rim of such beam 75, this base having a horizontal hole 129 therethrough to receive a swivel pin 131. From the rear surface of such block, depend a pair of stops 133 which are adapted to engage such beam in positioning the swivel base thereon.

The swivel pin is of a length sufficient to extend beyond both the front and rear surfaces of the base, and is provided to the front end of the base, with a non-circular head 137, preferably a disk shaped head formed with a radial extension 139 which, when the pin is assembled in the base, will lie in a direction other than the upward direction, and preferably in a horizontal direction.

To the tail end of the swivel pin, a retainer 143 is removably suspended by the application of a nut 145 to this end of the pin, the pin retainer being formed with an inturned flange 147 at its lower end, which is adapted to fit under the lower rim of the beam 75 on which the shoe is to be mounted.

A second retainer 151 is suspended from the swivel pin at the head end of the pin, and is of a length sufficient to extend below the upper rim of the beam 75, the two retainers serving to retain the swivel pin base 127 in proper slidable alignment with the beam on which the shoe is mounted. This second retainer is preferably rotatable on the pin 131 to facilitate removal and replacement of the swivel base or block 127 with respect to the beam 75, and without necessitating removal of the nut 145 and retainer 143.

The shoe 125 includes a plate 155 having preferably two openings 157, 159 therethrough, in vertical alignment, each of the general contour of the head 137 of the swivel pin, to permit of assembling the plate onto the pin in either of two elevational positions to thereafter rest in suspension from the pin at either of such elevations. The corresponding radial extension of each of the holes, however, will be in a vertical direction, whereby the plate will have to be rotated through an angle to permit assembling of the plate onto the pin, following which, the head of the swivel pin will function as a guard to preclude accidental dislodgment of the plate from the swivel pin. It further follows, that to remove such plate, the same will have to be lifted and then rotated through an angle to bring the radial extension of the hole into alignment with the radial extension of the pin head before removal can take place.

Along the lower edge of the plate is a load supporting flange 163 for insertion beneath a load to be supported. If desired, a wear strip 165 of wood or the like may be mounted on the flange.

To preclude such load from engaging the swivel pin head when in use, the plate 155 is provided with one or more spacer guide ribs 169 which will serve to maintain such load in sufficiently spaced relationship with respect to the plate, to clear the head of the swivel pin.

The swivel shoe assembly described may be applied to the load supporting beam 75 at any position thereon, and from there shifted to any location within the permissible range of shift. When handling cargo containers, all the swivel shoes will lie in the same plane, but where the load to be handled is in the form of a trailer of the piggyback type, the shoes at one end of the supporting beam will be adjusted to the higher elevation to accommodate such type of trailer.

It will be apparent from the foregoing description of my invention in its preferred form, that the same will fulfill all the objects attributed to my invention, and while I have illustrated and described the same in its preferred form and in considerable detail, I do not desire to be limited in my protection to such details except as may be necessitated by the appended claims.

I claim:

1. A cargo carrier comprising a crane of the gantry type having end frames and connecting beams, a carriage assembly supported by said connecting beams, a lifting spreader suspended from said carriage assembly, said lifting spreader comprising a substantially horizontal frame, a pair of spreader arms, each including a pair of substantially vertically disposed structural members with a hinge axis adjacent the upper end of each, a base beam, and means hingedly connecting said structural members adjacent their lower ends to said base beam, and means supporting said spreader arms from said frame and providing swing adjustment of said spreader arms laterally or longitudinally.

2. A cargo carrier comprising a crane of the gantry type having end frames and connecting beams, a carriage assembly supported by said connecting beams, a lifting spreader suspended from said carriage assembly, said lifting spreader comprising a substantially horizontal frame, a pair of spreader arms, each including a pair of substantially vertically disposed structural members with a hinge axis adjacent the upper end of each, a base beam, and means hingedly connecting said structural members adjacent their lower ends to said base beam, means supporting said spreader arms from said frame and providing for swing adjustment of said spreader arms longitudinally, said supporting means including a bracket assembly at each corner of said frame, and means pivotally securing said bracket assembly on a horizontal axis to said frame, and means for actuating said spreader arms in the longitudinal direction, said means including a cylinder carried by said frame adjacent a bracket assembly on each side of said frame, and a piston in each of said cylinders coupled to the proximate bracket assembly at a point removed from the pivot axis of the bracket assembly to produce angular movement of said bracket about its pivot axis.

3. A cargo carrier comprising a crane of the gantry type having end frames and connecting beams, a carriage assembly supported by said connecting beams, a lifting spreader suspended from said carriage assembly, said lifting spreader comprising a substantially horizontal frame, a pair of spreader arms, each including a pair of substantially vertically disposed structural members with a hinge axis adjacent the upper end of each, a base beam, and means hingedly connecting said structural members adjacent their lower ends to said base beam, means supporting said spreader arms from said frame and providing for swing adjustment of said spreader arms laterally or longitudinally, said supporting means including a bracket assembly at each corner of said frame, said bracket assembly having substantially parallel sides and connecting wall, and means pivotally securing said bracket at its connecting wall, on a horizontal axis to said frame, means hingedly suspending each spreader arm from a pair of said bracket assemblies, said hinge suspending means including a hinge pin through each of said pair of bracket assemblies and the proximate vertical structural member along the hinge axis thereof, means for actuating said spreader arms in the longitudinal direction, said means including a cylinder carried by said frame adjacent a bracket assembly on each side of said frame, and a piston in each of said cylinders coupled to the proximate bracket assembly at a point removed from the pivot axis of the bracket assembly to produce angular movement of said bracket assembly about its pivot axis, and means for actuating said spreader arms laterally, said means including a cylinder hingedly anchored to each bracket assembly and enclosing a piston coupled to the proximate vertical member at a point removed from its hinge axis.

4. A lifting spreader comprising a substantially horizontal frame, a pair of spreader arms, each including a pair of substantially vertically disposed structural members with a hinge axis adjacent the upper end of each, a base beam, and means hingedly connecting said structural members adjacent their lower ends to said base beam, and means supporting said spreader arms from said frame and providing swing adjustment of said spreader arms laterally or longitudinally, said spreader arms in the longitudinal direction, said means including a cylinder carried by said frame adjacent a bracket on each side of said frame, and a piston in each of said cylinders coupled to the proximate bracket at a point removed from the pivot axis of the bracket to produce angular movement of said bracket about its pivot axis; and means for actuating said spreader arms laterally, said means including a cylinder hingedly anchored to each bracket and enclosing a piston coupled to the proximate vertical member at a point removed from said hinge axis.

5. A lifting spreader comprising a substantially horizontal frame, a pair of spreader arms, each including a pair of substantially vertically disposed structural members with a hinge axis adjacent the upper end of each, a base beam, and means hingedly connecting said structural members adjacent their lower ends to said base beam, means supporting said spreader arms from said frame and providing for swing adjustment of said spreader arms longitudinally, said supporting means including a bracket assembly at each corner of said frame, and means pivotally securing said bracket assembly on a horizontal axis to said frame, and means for actuating said spreader arms in the longitudinal direction, said means including a cylinder carried by said frame adjacent a bracket assembly on each side of said frame, and a piston in each of said cylinders coupled to the proximate bracket assembly at a point removed from the pivot axis of the bracket assembly to produce angular movement of said bracket assembly about its pivot axis.

6. A lifting spreader for cargo handling, comprising a substantially horizontal frame, a pair of spreader arms, each including a pair of vertically disposed structural members with a hinge axis adjacent the upper end of each, a base beam, and means hingedly connecting said structural members adjacent their lower ends to said base beam, means supporting said spreader arms from said frame and providing for swing adjustment of said spreader arms laterally or longitudinally, said supporting means including a bracket assembly at each corner of said frame, said bracket assembly having substantially parallel sides and connecting wall, and means pivotally securing said bracket at its connecting wall, on a horizontal axis to said frame, means hingedly suspending each spreader arm from a pair of said bracket assemblies, said hinge suspending means including a hinge pin through each of said pair of bracket assemblies and the proximate vertical structural member along the hinge axis thereof, means for actuating said spreader arms in the longitudinal direction, said means including a cylinder carried by said frame adjacent a bracket assembly on each side of said frame, and a piston in each of said cylinders coupled to the proximate bracket assembly at a point removed from the pivot axis of the bracket assembly to produce angular movement of said bracket assembly about its pivot axis; and means for actuating said spreader arms laterally, said means including a cylinder hingedly anchored to each bracket assembly and enclosing a piston coupled to the proximate vertical member at a point removed from its hinge axis.

7. Shoe assembly for a lifting spreader or the like having a beam on which the shoe assembly is to be exclusively and slidably mounted, said shoe assembly comprising a swivel assembly adapted for slidable mounting on such beam, said swivel assembly including a block adapted to rest on and be slid along such beam, and a swivel pin in said block transversely of said beam, and a shoe assembly adapted for suspension from said swivel pin.

8. Shoe assembly for a lifting spreader or the like having a beam on which the shoe assembly is to be slidably mounted, said shoe assembly comprising a swivel assembly adapted for slidable mounting on such beam and a shoe assembly adapted for suspension from said swivel assembly, said swivel assembly including a swivel base adapted to slidably rest on the upper rim of such beam, a swivel pin extending through said swivel base and beyond each end thereof, said swivel pin having a non-circular contoured head, a swivel pin retainer removably suspended from the tail end of said swivel pin and having its lower end turned in to extend under such beam when said shoe assembly is assembled thereon, a second retainer suspended from said swivel pin toward the head end of said pin and of a length sufficient to extend below the upper rim of such beam, and said shoe assembly including a plate having an opening therein of the general contour of said swivel pin head to enable said plate to be applied to said swivel pin and be suspended from said pin, and a load supporting flange along the lower edge of said plate.

9. Shoe assembly for a lifting spreader or the like having a beam on which the shoe assembly is to be slidably mounted, said shoe assembly comprising a swivel assembly adapted for slidable mounting on such beam and a shoe assembly adapted for suspension from said swivel assembly, said swivel assembly including a swivel base adapted to slidably rest on the upper rim of such beam and having a horizontal hole therethrough to receive a swivel pin, and stop means at the rear thereof adapted to engage such beam in positioning said swivel base thereon, a swivel pin haivng a non-circular contoured head, said swivel pin extending through said hole and beyond each end thereof, a swivel pin retainer removably suspended from the tail end of said swivel pin and having its lower end turned in to extend under such beam when said shoe assembly is assembled thereon, a second retainer suspended from said swivel pin toward the head end of said pin and of a length sufficient to extend below the upper rim of such beam, and said shoe assembly including a plate having vertically aligned openings therein of the general contour of said swivel pin head to enable said plate to be applied to said swivel pin at either of said openings and be suspended from said pin, a load supporting flange along the lower edge of said plate, and means for guiding a load to said flange in spaced relationship to said plate to clear said swivel pin head.

10. Shoe assembly for a lifting spreader or the like having a beam on which the shoe assembly is to be slidably mounted, said shoe assembly comprising a swivel assembly adapted for slidable mounting on such beam and a shoe assembly adapted for suspension from said swivel assembly, said swivel assembly including a swivel base adapted to slidably rest on the upper rim of such beam and having a horizontal hole therethrough to receive a swivel pin, and a pair of depending stops at the rear thereof adapted to engage such beam in positioning said swivel base thereon, a swivel pin having a disk head with a radial extension in a direction other than in the upward direction, said swivel pin extending through said hole and beyond each end thereof, a swivel pin retainer removably suspended from the tail end of said swivel pin and having its lower end turned in to extend under such beam when said shoe assembly is assembled thereon, a second retainer suspended from said swivel pin toward the head end of said pin and of a length sufficient to extend below the upper rim of such beam, and said shoe assembly including a plate having vertically aligned openings therein of the general contour of said swivel pin head but with the corresponding radial extension in the upward direction to enable said plate to be applied to said swivel pin at either of said openings and be suspended from said pin, a load supporting flange along the lower edge of said plate, and means for guiding a load to said flange in spaced relationship to said plate to clear said swivel pin head.

References Cited in the file of this patent
UNITED STATES PATENTS

| | | |
|---|---|---|
| 1,608,925 | Callison | Nov. 30, 1926 |
| 1,745,049 | Systrom | Jan. 28, 1930 |

FOREIGN PATENTS

| | | |
|---|---|---|
| 249,254 | Germany | July 15, 1912 |